(12) United States Patent
Singh et al.

(10) Patent No.: US 12,184,741 B2
(45) Date of Patent: Dec. 31, 2024

(54) METHOD TO SECURELY UPDATE OVER-THE-AIR FIRMWARE

(71) Applicant: Arlo Technologies, Inc., Carlsbad, CA (US)

(72) Inventors: Rajinder Singh, San Jose, CA (US); Mark Kretsch, Carlsbad, CA (US); Tristan Hipolito, Carlsbad, CA (US); Yun Tu, Vancouver (CA)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 18/099,392

(22) Filed: Jan. 20, 2023

(65) Prior Publication Data

US 2024/0251020 A1 Jul. 25, 2024

(51) Int. Cl.
*H04L 67/00* (2022.01)
*G06F 8/65* (2018.01)
*H04W 8/00* (2009.01)

(52) U.S. Cl.
CPC .............. *H04L 67/34* (2013.01); *G06F 8/65* (2013.01); *H04W 8/005* (2013.01)

(58) Field of Classification Search
None
See application file for complete search history.

(56) References Cited

U.S. PATENT DOCUMENTS

| | | | |
|---|---|---|---|
| 10,841,791 B1* | 11/2020 | Zhang | H04W 72/51 |
| 11,045,738 B1* | 6/2021 | Unruh | A63F 13/235 |
| 11,175,906 B2* | 11/2021 | Jeong | G07C 5/008 |
| 2016/0226519 A1* | 8/2016 | Meng | G06F 9/445 |
| 2020/0012488 A1* | 1/2020 | Koval | G06F 9/4401 |
| 2020/0218811 A1 | 7/2020 | Rangel-Martinez et al. | |
| 2021/0200529 A1* | 7/2021 | Yeh | G06F 8/65 |
| 2021/0209231 A1* | 7/2021 | Weigand | G06F 8/65 |
| 2021/0334380 A1* | 10/2021 | Saluja | G06F 21/572 |
| 2021/0400439 A1* | 12/2021 | Troester | H04W 12/03 |
| 2022/0027138 A1* | 1/2022 | Stevens | G06F 21/572 |
| 2022/0095698 A1* | 3/2022 | Talbot | H04L 67/34 |
| 2023/0289811 A1* | 9/2023 | Patel | G06Q 20/3278 |

* cited by examiner

*Primary Examiner* — Jeffrey R Swearingen
(74) *Attorney, Agent, or Firm* — Boyle Fredrickson S.C.

(57) ABSTRACT

A method of updating of firmware to a client device such as a BLE button is provided. The method includes the steps of providing a first user device and detecting the client device with the first user device. It is determined if the client device is in an update mode in response to instructions from a second user device. The firmware is uploaded from the first user device to the client device in response to the client device being in the update mode.

18 Claims, 3 Drawing Sheets

METHOD TO SECURELY UPDATE OVER-THE-AIR FIRMWARE

FIELD OF THE INVENTION

This invention relates generally to the updating of firmware to a client device, and in particular, to a method of securely updating over-the-air (OTA) firmware to a client device utilizing crowd sourcing and to a system that implements such a method.

BACKGROUND OF THE INVENTION

As is known, firmware images and configuration files defining the parameters, options, settings and preferences applied to hardware (hereinafter referred to collectively as "firmware") are types of software that control the hardware of a client device, e.g., a monitoring device, a sensor, a camera or a communication pushbutton, such as a BLE button. In less complex devices, the firmware acts as the client device's complete operating system, performing all control, monitoring and data manipulation functions. It can be appreciated that, over time, the firmware on a client device may need to be updated. For example, the firmware may be updated to fix various bugs in the software or to introduce new functions for the client device, thereby enhancing a user's experience with the client device.

Typically, firmware is stored in non-volatile memory on the client device. However, in less-complex devices, the non-volatile memory on the client device is limited such that the non-volatile memory is capable of hosting only a single firmware image. Hence, in order to upgrade the firmware, the non-volatile memory must be reprogrammed utilizing a special procedure during which, as the firmware is uploaded, the client device no longer runs the previously embedded code and no longer has its intended functionality. In most instances, the process for uploading the firmware to the client device is initiated by a user operated device, such as a mobile phone, laptop, tablet or the like, in communication with the client device, also the process of downloading the firmware can be initiated and handled by the device itself.

If a device has space for only a single firmware image, and the process is initiated, a firmware image downloaded by the client device from the user is written over the existing firmware image while the device switches to an update r mode to support the upgrade. While this process is usually relatively quick and seamless, interruptions in the downloading process of the firmware can occur. For example, when downloading the firmware from a mobile phone, the process may be interrupted if the battery of the mobile phone dies or if the mobile phone becomes disconnected from the client device. In circumstances in which the communication connection between the user device and the client device is terminated before the download process is completed, the client device will be unable to perform its intended functionality.

Heretofore, if the downloading process is interrupted, a user must reinitiate the process utilizing the mobile device from with which the downloading process was originally initiated. It can be understood that it may not be possible to reinitiate the downloading process in the near term, e.g., if the mobile phone needs to be charged or if the user exits the geographic area in which communication with the client device is possible. Consequently, it is possible that the client device will not perform its intended functionality for an extended period of time. The failure of the client device to perform its intended functionality over an extended period of time, with resultant extended downtime of the client device, may constitute a nuisance at the very least, and can be a serious problem if the client device is used for security purposes. As such, there exists a need for securely completing the downloading process of OTA firmware to a client device in the event the downloading process is interrupted.

SUMMARY OF THE INVENTION

In accordance with a first aspect of the invention, a system and method of securely updating OTA firmware to a client device such as a camera, a sensor, a BLE button, or other IoT (Internet of Things) devices, utilizes crowd sourcing is provided. A "BLE button" in this regard is a push-button hand-carried device that communicates via a short range wireless signal such as "Bluetooth®"

In accordance with the present, a method of updating of a firmware image to a client device is provided. The method includes the steps of providing a user device and detecting the client device with the user device. It is determined if the client device is in an update mode, and if so, the firmware image is uploaded from the user device to the client device in response. Both the client device and the (crowd-sourced) user device need to be verified and trusted by each other using trust mechanisms, such as PKI (Public Key Infrastructure), or other identity verification methods. If the client device and/or the crowd-sourced device are not trusted by the one or the other, then the firmware upgrade process will not be initiated.

A user may or may not be notified the detection of the client device needing the firmware upgrade. In order to detect the client device, a communications network is scanned with the user device such that a beacon broadcast from the client device may be detected. The beacon includes a status of the client device, device type, and current firmware. For example, the status may include information as to whether the client device is in the update mode, or if the current firmware image needs to be updated. The rules for upgrading a trusted/verified client device may be checked by the user device from the server before initiating the firmware upgrade. The status of the client device may be verified prior to uploading the firmware from the user device to the client device. In addition, permission of the user of the user device may be requested before uploading the firmware to the client device. Alternatively, the firmware may be automatically uploaded from the user device to the client device in response to detection of the client device in the update mode. The firmware may be encrypted using a secure key, signed and compressed prior to uploading the firmware to the client device. The client device un-compresses the firmware, decrypts the firmware using the secure key, and verifies the firmware upon receipt of the firmware.

In accordance with a further aspect of the present invention, a method of updating of firmware to a client device is provided. The method includes the step of receiving a beacon from a client device, The beacon may include the status of the client device, device type, current firmware version, serial number, or other device details needed for the firmware upgrade process. The status, device type, and firmware version of the client device are verified, and the firmware is uploaded to the client device in response to the status and rules available via the server to the user device to determine if the firmware upgrade is needed.

The beacon may be received by a user device and the user device may notifying a user of the status of the client device. In order to receive the beacon, a communications network is scanned with the user device. The status includes information as to whether the client device is in the update mode. Permission of a user to upload the firmware to the client device may be requested prior to uploading the firmware. Alternatively, the firmware may be automatically uploaded to the client device in response to status. The firmware may be encrypted using a secure key, signed, and compressed prior to uploading the firmware to the client device. The client device un-compresses the firmware, decrypts the firmware using the secure key, and verifies the firmware upon receipt of the firmware.

In accordance with a still further aspect of the present invention, a method of updating of firmware to a client device is provided. The method includes the steps of providing a first user device and detecting the client device with the first user device. It is determined if the client device is in an update mode in response to instructions from a second user device. The firmware is uploaded from the first user device to the client device in response to the client device being in the update mode.

The first user device may be a first user device and the second user device may be a second user device. A user of the first user device may be notified of the detection of the client device. In order to detect the client device, the first user device scans a communications network to detect a beacon broadcast from the client device. The beacon includes a status of the client device. The status of the client device may be verified prior to uploading the firmware from the first user device to the client device. In addition, permission of a user of the first user device to upload the firmware to the client device may be requested prior to uploading the firmware. The firmware may be automatically uploaded from the first user device to the client device in response to detection of the client device in the update mode. It is contemplated for the firmware to be encrypted using a secure key, signed and compressed prior to uploading the firmware to the client device. The client device un-compresses, decrypts firmware using the security key and verifies the firmware upon receipt of the firmware.

It is contemplated for trusted and verified client devices to be automatically upgraded by trusted and verified user devices, as well as, trusted and verified applications running on the user devices without notifying the user. In a crowd-source environment, this arrangement will insure that trusted and verified devices operating in an echo-systems can be updated/upgraded by other trusted and verified devices in an electronic monitoring echo-system. Any device(s) not performing their intended operations or not performing their intended operations at the optimal-level due to older firmware images or other firmware related issues can be upgraded by crowd-sourced user devices.

Further, as noted above, the firmware update may be directed to updated configuration(s) or file(s) instead of the firmware image. As such, it can be understood that trusted and verified user devices in the network monitoring echo-system can accordingly push updated configurations and/or configuration files to the client devices. For example, client device can receive new audio file(s) and related configurations for playing various sounds. Alternatively, it can be appreciated that the client devices may receive an updated firmware image or configuration file(s) in parts via one or more trusted and verified user devices in the electronic monitoring echo system. Once the complete firmware image and/or configuration files are received, the client device can verify the downloaded/upgraded firmware and/or files before running the updated firmware image and files.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE DRAWINGS

Figure 1:
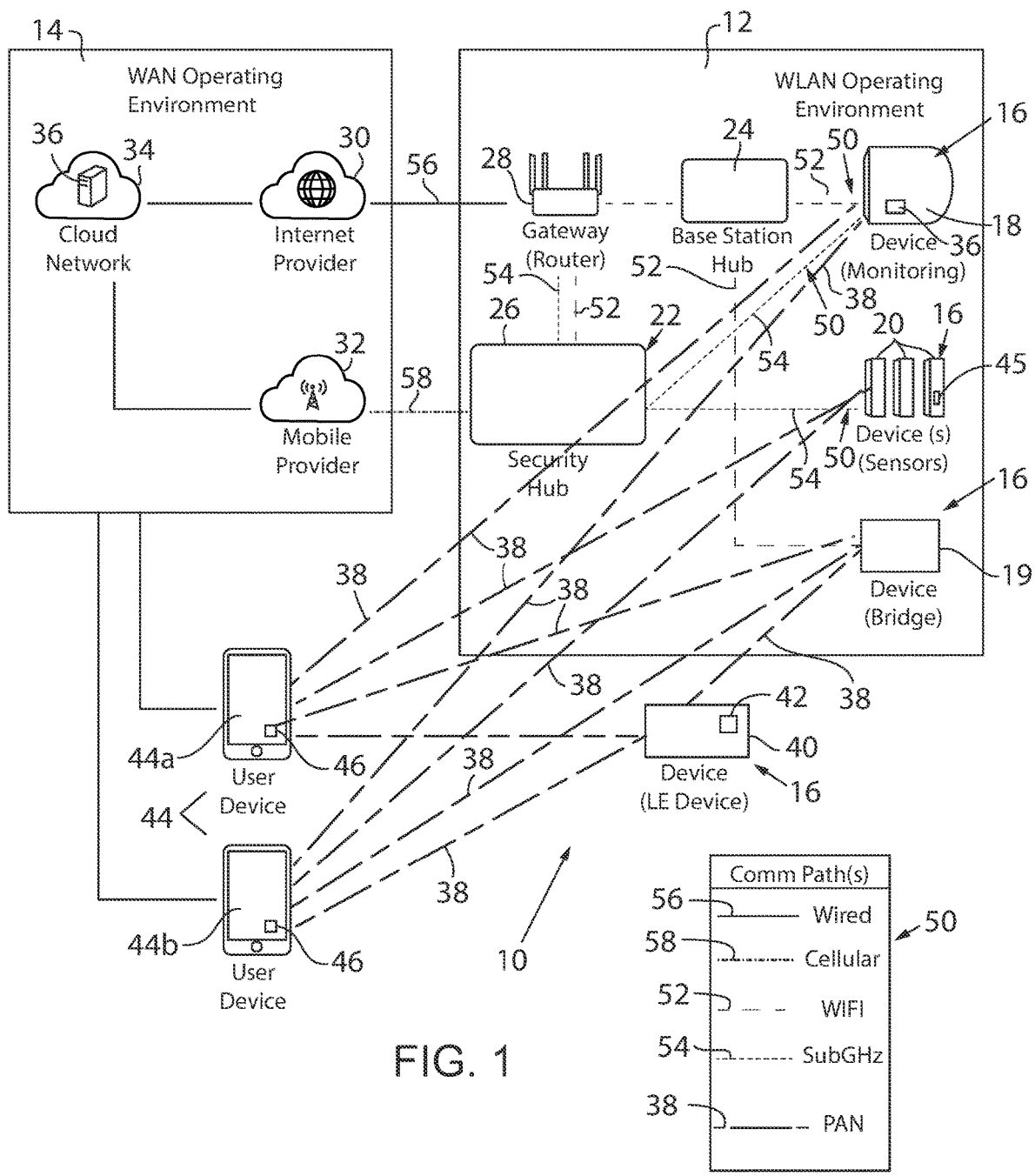
FIG. 1 is a schematic representation of an electronic monitoring system for effectuating the methodology of the present invention.

Referring to FIG. 1, an electronic monitoring system 10 in accordance with an aspect of the present invention is generally designated by the reference numeral 10. Electronic monitoring system 10 is implemented in a wireless communication operating environment. For example, wireless communication may be implemented by a WLAN (wireless local area network) operating environment (WLAN 12) or by direct Bluetooth® or any communications technology on a personal area network (PAN) between the various components of electronic monitoring system 10 and/or one or more user devices 44, as hereinafter described.

In the depicted embodiment, WLAN 12 is communicatively connected to a WAN (wide area network) operating environment, designated by the reference numeral 14. Within WLAN 12, various client devices 16, such as monitoring devices 18, bridges 19 and sensors 20, are wirelessly networked to a base station or high frequency hub 24 which, in turn, communicates with the WAN 14 via a gateway hub shown as gateway router 28. Base station hub 24 and router 28 provide a high frequency connection to the WAN 14. Base station hub 24 may be eliminated as a stand-alone module if its functionality is incorporated into the gateway router 28, in which case the router 28 also serves as a base station hub. The system may also include a security hub 26 that communicates with monitoring device(s) 18 and with the WAN 14 and provides a low frequency connection between the WAN 14 and monitoring devices 18. If present, the security hub may also communicate with the router or hub 28, such as through a high frequency connection path 52 and/or a low frequency connection 54 path to the router 28. The security hub 26 is also provided with the capability providing a high frequency connection with monitoring devices 18. If the security hub 28 is not present, Still referring to FIG. 1, gateway router 28 is typically implemented as a WIFI hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub, as well as the router. Another connection between WLAN 12 and WAN 14 may be provided between security hub 26 and a mobile provider 32. Mobile provider 32 includes hardware or system components or features to implement various cellular communications protocols such as 3G, 4G, LTE (long term evolution), 5G, or other cellular standard(s). Besides the mobile connection, security hub 26 typically also is configured to connect to WAN 14 by way of its connection to router hub 28 and the router hub's connection to WAN 14 through internet provider 30. Each of the internet provider 30 and mobile provider 32 allows the components of system 10 to interact with a backend system or control services that can control functions or provide various processing tasks of components of system 10, shown as a cloud-based backend control service system 34, which could be an Arlo SmartCloud™ system. The backend system, such the cloud-based control service system 34 includes at least one server 36 and typically provides, for example, cloud storage of events, AI (artificial intelligence) based processing such as computer vision, and system access to emergency services.

As noted above, electronic monitoring system 10 typically includes multiple monitoring devices 18 that are mounted to face toward respective areas being monitored, such as around a building or other structure or area. It is intended for monitoring devices 18 to perform a variety of monitoring, sensing, and communicating functions. Each monitoring device 18 includes a firmware image stored in non-volatile memory thereon. As is conventional, the firmware image acts as the monitoring device's complete operating system, performing all control, monitoring and data manipulation functions. The system 10 may also include device(s) and system that perform functions other than monitory. Such devices include smart home devices such as HVAC control systems and components. The also could include one-touch type communication devices such as panic buttons and other communication buttons. One such button is marketed under Arlo Technologies, Inc. under the brand name ARLO SAFE™. All of these devices and systems can be considered "monitoring devices" for purposes of the present discussion. Devices that communicate using LE protocols such as Bluetooth® can be considered "LE devices". Devices that communicate with Bluetooth® Low Energy, are considered "BLE devices", including the "BLE Button".

One such monitoring device 18 may include an imaging device, such as a video camera, that is configured to capture and store visual images or video of the monitored area within the environment, e.g., an Arlo® camera available from Arlo Technologies, Inc. of Carlsbad, California. In addition to containing a camera, the monitoring device 18 may also include a one or more sensors configured to detect one or more types of conditions or stimulus, for example, motion, opening or closing events of doors or windows, the presence of smoke, carbon monoxide, water leaks, and temperature changes. Instead of or in addition to containing sensors, monitoring device 18 may have audio device(s) such as microphones, sound sensors, and speakers configured for audio communication or providing audible alerts. Other types of monitoring devices 18 may have some combination of sensors 20 and/or audio devices without having imaging capability. One such device is Arlo Chime™ which has only audio capabilities. Sensors 20 or other monitoring devices 18 also may be incorporated into form factors of other house or building accessories, such as doorbells, floodlights, etc.

In order to allow for low and high frequency communication on WLAN 12, it is contemplated for monitoring devices 18 to have two radios operating at different frequencies. A first, "primary" radio operates at a first frequency, typically at a relatively high frequency, typically of 2.4 GHz to 5 GHZ, during period of normal conductivity to perform monitoring and data capture functions such as video capture and transmission, sound transmission, motion sensing, etc. The second or "secondary radio" operates at a second frequency that is immune or at least resistant to resistance from signals that typically jam signals over the first frequency. The second frequency may be of considerably lower frequency in the sub-GHz or even RF range and may have a longer range than the primary radio. It is intended for the secondary radio to be operable, when communications over the primary communication path are disrupted, in order to permit the continued operation of monitoring devices 18, as well as, to permit transmit and display information regarding the communications disruption to be transmitted and displayed for a user. The term "disruption," as used herein, applies equally to an initial failure to connect over the primary communication path upon device startup and a cessation or break in connection after an initial successful connection. In addition, it is contemplated for each monitoring device 18 to include Bluetooth® or any PAN communications module 36 designated for wireless communication. As is known, modules 36 allows monitoring devices 18 to communicate directly with one or more user devices 44 over a wireless Personal Area Network (PAN) 38, as hereinafter described. Likewise, sensors 20 may include Bluetooth® or any PAN communications module 45 to allow sensor 20 to communicate directly with one or more user devices 44 over a wireless Personal Area Network (PAN) 38, as hereinafter described.

Alternatively, client devices 16 may take the form of low energy (LE) devices 40 which utilize Bluetooth® or other PAN communications technology to communicate. It is intended for LE devices 40 to perform a variety of basic tasks. For example, one such device is an Arlo® Security Light equipped with a motion sensor which illuminates an area in response to motion detection. Other LE devices 40 may include one or more sensors configured to detect one or more types of conditions or stimulus, for example, motion, opening or closing events of doors or windows, the presence of smoke, carbon monoxide, water leaks, and temperature changes and provide an alert in response thereto. Alternatively, LE devices 40 may be configured to actuate components such as door locks, switches or the like in response to a command by a user. LE devices 40 include a firmware image stored in non-volatile memory thereon. As is conventional, the firmware image acts as LE device's complete operating system, performing all control, monitoring and data manipulation functions. Each LE device 40 further includes Bluetooth® or any PAN communications technology module 42 designated for wireless communication using low energy "LE" protocols. As is known, modules 42 allows LE devices 40 to communicate with various components, such as one or more user devices 44 or bridge 19 over PAN 38, as hereinafter described.

In order for LE devices 40 to communicate on WLAN 12, bridges 19 are provided. Similar to monitoring devices 18, LE devices 40 may include two radios operating at different frequencies in order to allow for low and high frequency communication on WLAN 12. A first, "primary" radio operates at a first frequency, typically at a relatively high frequency, typically of 2.4 GHz to 5 GHZ, during periods of normal conductivity. The second or "secondary radio" operates at a second frequency that is immune or at least resistant to resistance from signals that typically jam signals over the first frequency. The second frequency may be of considerably lower frequency in the sub-GHz or even RF range and may have a longer range than the primary radio. It is intended for the secondary radio to be operable, when communications over the primary communication path are disrupted. In addition, it is contemplated for each bridge 19 to include Bluetooth® or any PAN technology module 46 designated for wireless communication. As is known, modules 46 allows bridges 19 to communicate directly with LE devices 40 over PAN 38, as hereinafter described.

Figure 2:
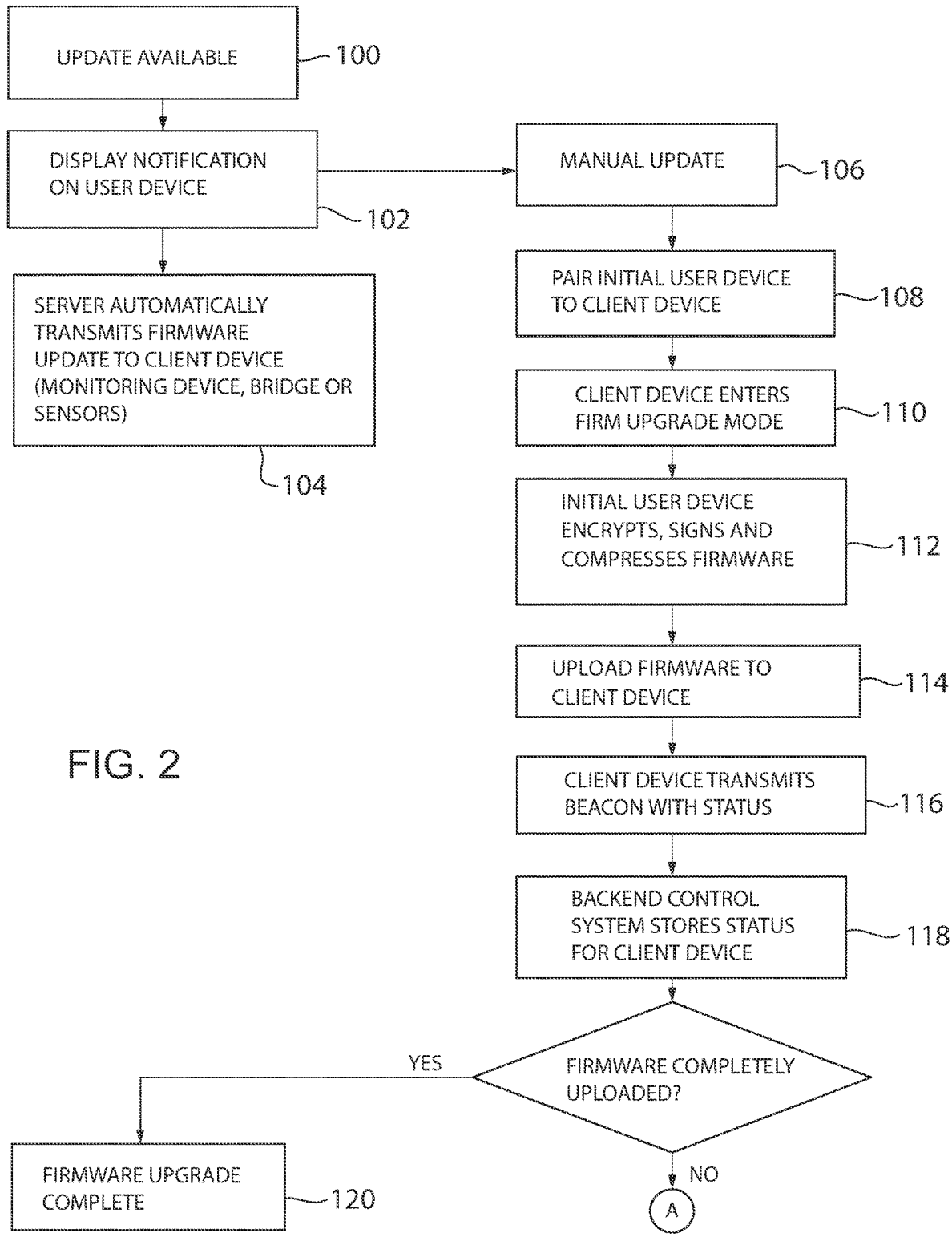
FIG. 2 is a flowchart showing a first set of steps in the methodology of the present invention.
Figure 3:
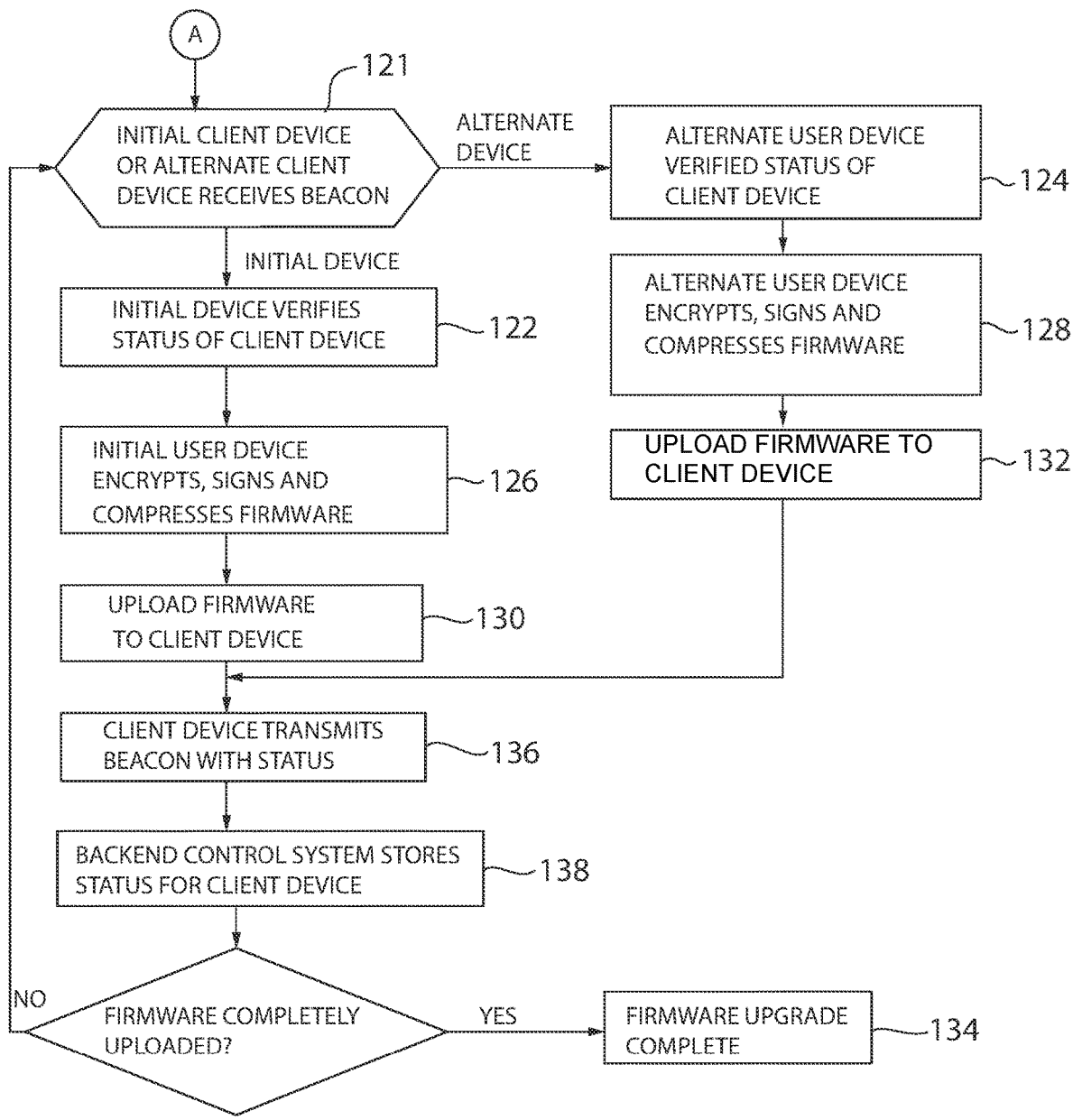
FIG. 3 is a flowchart showing a second set of steps in the methodology of the present invention.

Still referring to FIG. 1, one or more user devices 44, such as a smart phone, tablet, laptop, or PC, may communicate with various components of electronic monitoring system 10. It can be understood that user devices 44 may communicate with the various components of electronic monitoring system 10 utilizing WLAN 12, WAN 14 and/or PAN 38 to provide an interface through which a user may interact with electronic monitoring system 10, including client devices 16. Each user device 44 includes a display system that typically includes both an audio display and a video display such as a touchscreen. Each user device 44 also has internal computing and storage capabilities and a program or application, such as the Arlo Smart application, serving as the user interface with the remainder of system 10. Each user devices 44 include at least one actuatable user input 46, FIGS. 1-2. In response to the information provided on the display of the one or more user devices 44, a user may actuate the at least one actuatable user input 41 to address the information.

Still referring to FIG. 1, within WLAN 12, multiple communication paths 50 are defined that transmit data between the various components of system 10. Communication paths 50 include a default or primary communication path 52 providing communication between monitoring device 18 and the base station hub 26, and a fail-over or fallback secondary communication path 54 providing communication between monitoring device 18 and the security hub 26. Optionally, some of the monitoring devices 18 that do not require high bandwidth to operate may only communicate through the secondary communication path 54, such as sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. If the security hub 26 and the associated secondary communication path 54 are not present, the sensors 20 may communicate directly with the base station hub 24 (if present, or the router 28 if the functionality of the base station hub is incorporated into the router) via the primary communication path 52.

Primary communication path 52 also extends between bridge 19 and the base station hub 26, and secondary communication path 54 may provide for fail-over or fallback communication between bridge 19 and the security hub 26, if the security hub 26 is present. The controllers of bridges 19 may also provide a wireless communication path directly to the router 28.

As described, electronic monitoring system 10 is configured to implement a seamless OTA communication environment for each client device 16 by implementing a communication path switching strategy as a function of the operational state of primary and/or secondary communication paths, as heretofore described. For example, each monitoring device 18 is configured to acquire data and to transmit it to a respective hub 24 and/or 26 for further processing and/or further transmission to a server such as the server 36 of the cloud-based control service system 34 and/or the user device(s) 44. The server 36 or other computing components of system 10 or otherwise in the WLAN 12 or WAN 14 can include or be coupled to a microprocessor, a microcontroller or other programmable logic element (individually and collectively considered "a controller") configured to execute a program. The controller also may be contained in whole in the monitoring device 18, base station hub 24, security hub 26, and/or the WIFI hub or router 28. Alternatively, interconnected aspects of the controller and the programs executed by it could be distributed in various permutations within the monitoring device 18, the hubs 24 and 26, router 28, and the server 36. This program may be utilized in filtering, processing, categorizing, storing, recalling and transmitting data received from the monitoring device 18 via the hubs 24 and 26, router 28, and server 36. Server 36 or other appropriate system device may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording.

Client devices in the form of LE devices 40 are configured to transmit data through a corresponding bridge 19 via PAN 38 to a respective hub 24 and/or 26 for further processing and/or further transmission to a server such as the server 36 of the cloud-based control service system 34 and/or the user device(s) 40. For example, each LE device 40 will periodically broadcast a beacon including their current state, which is received by a corresponding bridge 19, the device type, the current version of firmware on LE device 40, the serial number, or other device details needed for the firmware upgrade process. Bridge 19 transmits the beacon through a respective hub 24 and/or 26 to server 36, as heretofore described. It is further contemplated for such information to be accessible to a user through the one or more user devices 44 communicating with backend control service system 34, either by the user directly accessing backend control service system 34 or by backend control service system 34 transferring information to or causing a notification or causing a corresponding graphical icon to be provided on a display of the one or more user devices 44.

Typically, if an update to the firmware (e.g. a firmware image, a portion of a firmware image, configuration(s) and/or configuration file(s) defining the parameters, options, settings and preferences for hardware) for client device 16 is available, block 100, a notification or a corresponding graphical icon is provided on a display of the one or more user devices 44 of a user, as heretofore described, block 102. In the case of monitoring device 18, bridge 19 and sensors 20, it is contemplated for server 36 to automatically transmit an encrypted, signed and compressed firmware update to such client devices 16 through the primary and secondary communication paths 52 and 54, respectively, as heretofore described.

In order to update the firmware of LE device 40 or if a user wishes to manually upload a firmware update to monitoring device 18, bridge 19 or sensors 20, block 106, client device 16 must be onboarded with the application serving as the user interface on an initial user device 44a. More specifically, initial user device 44a is paired to client device 16 on PAN 38, block 108. Both client device 16 and user device 44a must be verified and trusted by each other using a trust mechanism, such as PKI or another identity verification method. If client device 16 and/or user device 44a are not trusted by the one or the other, then the firmware upgrade process will not be initiated. Once initial user device 44a and client device 16 are verified and trusted by each other and paired, it is contemplated for client device 16 to automatically enter a firmware upgrade mode, block 110. Alternatively, a user may navigate through sequential menus appearing on the display of initial user device 44a to selectively initiate client device 16 entering the firmware upgrade mode.

Once client device 16 enters the firmware upgrade mode, initial user device 44a encrypts the firmware using a secure key, signs the encrypted firmware and compresses the firmware, block 112. Once the firmware is encrypted, signed and compressed, initial user device 44a uploads the firmware to client device 16, block 114. It can be understood that client device 16 remains in the firmware upgrade mode until the firmware upgrade is completely uploaded to client device 16, block 120. As such, when in the firmware upgrade mode, client device 16 no longer runs embedded code, and thus, client device 16 does not have its intended functionality.

If there is an interruption to the firmware upgrade and client device 16 becomes no longer paired with user device 44 while client device 16 is in the firmware upgrade mode, client device 16 will periodically transmit a beacon providing the status of the upgrade, e.g., the firmware upgrade has been interrupted, block 116, or the upgrade has been completed, block 120. It can be appreciated that the beacon may include other types of information including, but not limited to, the device type, the device's current firmware version, the serial number of the device, or other device details needed for the firmware upgrade process. If client device 16 takes the form of monitoring device 18, bridge 19 or sensors 20, the beacon is transmitted through the primary communication path 52 (or the secondary communication path 54 in the event the primary communication path is disrupted) and security hub 26 to backend control service system 34. In addition, the beacon may also be broadcast over PAN 38, for reasons hereinafter described. The backend control service system 34 receives the beacon and stores the current status of the noted client device 16, block 118. In response to the receipt of the beacon, backend control service system 34 may communicate with initial user device 44a and cause a notification or causing a corresponding graphical icon to be provided on a display of initial user device 44a to advise the user of the interruption to the firmware upgrade.

If client device 16 takes the form of a LE device 40, the beacon is transmitted from the LE device 40 over PAN 38. Bridge 19 receives the beacon and transmits the beacon over primary communication path 52 (or secondary communication path 54 in the event the primary communication path is disrupted) and security hub 26 to backend control service system 34. The backend control service system 34 receives the beacon and stores the current status of LE device 40. In addition, in response to the receipt of the beacon, backend control service system 34 may communicate with initial user device 44a and cause a notification or causing a corresponding graphical icon to be provided on a display of initial user device 44a to advise the user of the interruption to the firmware upgrade.

In response to receipt of the information indicating the interruption to the firmware upgrade, if initial user device 44a is still able to communicate with user device 16 over PAN 38, initial user device 44a will automatically encrypt a new copy of the interrupted firmware upgrade using a secure key, sign the new copy of the encrypted firmware and compress the new copy of the firmware. Once the new copy of the firmware is encrypted, signed and compressed, the initial user device 44a will upload the new copy of the firmware to client device 16. As noted above, it can be understood that client device 16 remains in the firmware upgrade mode until the firmware is completely uploaded to client device 16.

Further, it is contemplated for the beacon broadcast on PAN 38 to be receivable by initial user device 44a or, alternatively, by an alternate user device, generally designated by the reference numeral 44b, block 121. Upon receipt of the beacon, either initial user device 44a, block 122, or alternate user device 44b, block 124, will contact the backend control service system 34 to the verify the status of client device 16. Once the status of client device 16 is verified, the initial user device 44a or alternate user device 44b which received the beacon will advise the user of the initial user device 44a or alternate user device 44b which received the beacon that the firmware e upgrade originally transmitted to client device 16 has been interrupted. Upon receiving permission from the user of the initial user device 44a or alternate user device 44b which received the beacon, the initial user device 44a, block 126, or alternate user device 44b, block 128, client device 16 and initial user device 44a or alternate user device 44b are verified and trusted by each other, as heretofore described. The initial user device 44a or the alternate user device 44b which received the beacon encrypts a new copy of the interrupted firmware upgrade using a secure key, signs the new copy of the encrypted firmware and compresses the new copy of the firmware. Once the new copy of the firmware is encrypted, signed and compressed, the initial user device 44a, block 130, or alternate user device 44b, block 132, which received the beacon uploads the new copy of the firmware to client device 16. It can be understood that client device 16 remains in the firmware upgrade mode until the firmware is completely uploaded to client device 16, block 134.

Alternatively, once the status of client device 16 is verified, the initial user device 44a or alternate user device 44b which received the beacon will automatically encrypt a new copy of the interrupted firmware upgrade using a secure key, sign the new copy of the encrypted firmware and compress the new copy of the firmware. Once the new copy of the firmware is encrypted, signed and compressed, the initial user device 44a or alternate user device 44b which received the beacon uploads the new copy of the firmware to client device 16. Again, it can be understood that client device 16 remains in the firmware upgrade mode until the firmware is completely uploaded to client device 16, block 134.

As heretofore described, client device 16 will periodically transmit a beacon providing the status of the upgrade, e.g., the firmware upgrade has been interrupted or the upgrade has been completed, block 136. The backend control service system 34 receives the beacon and stores the current status of the noted client device 16, 140. It can be appreciated that if the firmware upgrade has been interrupted, the process may be repeated to effectuate the upgrade of the firmware for client device 16.

As described, if the downloading process is interrupted, the methodology of the present invention allows for the downloading process to be reinitiated not only by the initial user device 44a which the downloading process was originally initiated, but also alternate user devices 44b upon verification and authorization from backend control service system 34. It can be appreciated that the method of the present invention allows for the downloading process to be reinitiated in the near term by an alternate user device 44b if, for example, the initial user device 44a needs to be charged or exits the geographic area in which communication with client device 16 is possible.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

We claim:

1. A method of updating of a firmware to a client device, comprising the steps of:
   broadcasting a beacon with the client device, the beacon including a status of the firmware on the client device;
   providing a user device and a backend control service system;
   detecting the beacon broadcast by the client device with the user device, the beacon received by the user device over a first communication path;
   receiving the beacon broadcast by the client device with the backend control service system over a second communication path, which differs from the first communication path;
   storing the status of the firmware on the backend control service system;
   determining if the client device is in an update mode;
   contacting the backend control service system with the user device to verify the status of the firmware on the client device; and
   uploading an updated firmware from the user device to the client device in response to the client device being in the update mode.

2. The method of claim 1, comprising the additional step of notifying a user of the user device of the detection of the client device.

3. The method of claim 1, wherein the status includes information as to whether the client device is in the update mode.

4. The method of claim 1, further comprising the additional step of requesting permission of a user of the user device to upload the updated firmware to the client device prior to uploading the firmware.

5. The method of claim 1, wherein the updated firmware is automatically uploaded from the user device to the client device in response to detection of the client device in the update mode.

6. The method of claim 1, comprising the additional steps of encrypting the updated firmware using a secure key, signing the updated firmware, and compressing the updated firmware prior to uploading the updated firmware to the client device.

7. The method of claim 6, wherein the client device uncompresses the updated firmware, decrypts the updated firmware using the secure key, and verifies the updated firmware upon receipt of the updated firmware.

8. The method of claim 1, wherein the client device comprises a BLE button.

9. A system for updating a firmware to a client device, the system comprising:
   a backend control service system configured to receive a beacon transmitted along a first communication path from a client device, the beach containing information including the status of the firmware on the client device;
   a processor executing a program stored in a non-transient medium to:
   receive the beacon transmitted along a second communication path from the client device;
   contact the backend control service system to verify the status of the client device;
   determine if an update to the firmware of the client device is needed in response to the status of the client device; and
   if updated firmware is available, upload the updated firmware to the client device in response to the determination.

10. The system of claim 9, wherein the processor is housed in a user device and is configured such that the beacon is received by the user device, the user device configured to notify a user of the status of the client device.

11. The system of claim 9, wherein the processor is configured to cause the user device to scan the second communications network for the beacon.

12. The system of claim 9, wherein the processor is configured to cause the user device to request permission of a user to upload the updated firmware to the client device prior to uploading the updated firmware.

13. The system of claim 9, wherein the processor is configured to cause updated firmware to be automatically uploaded to the client device in response to the determination.

14. The system of claim 9, wherein the user device is a BLE button.

15. A method of updating of a firmware to a client device, comprising the steps of:
   broadcasting a beacon with the client device, the beacon including a status of the firmware on the client device;
   providing a first user device and a backend control service system;
   detecting the beacon broadcast by the client device with the first user device, the beacon received by the first user device over a first communication path;
   receiving beacon broadcast the client device with the backend control service System over a second communication path, which differs from the first communication path;
   storing the status of the firmware on backend control service system;
   determining if the client device is in an update mode;
   contacting the backend control service, with the first user device to verify the status of the firmware on the client device;
   uploading updated firmware from the first user device to the client device in response to the client device being in the update mode; and
   determining if uploading of the firmware has been interrupted, and if interrupted, comprising the additional steps of;
   contacting the backend control service system with a second user device to verify the status of the firmware on the client device; and
   uploading the updated firmware to the client device from the second user device in communication with the client device.

16. The method of claim 15, further comprising determining if the first user device is in communication with the client device after the determination that the uploading of the firmware has been interrupted and prior to the uploading the firmware to the client device from the second user device, and if the first user device in communication with the client device, uploading the updated firmware to the client device from the first user device; and skipping the step of uploading the updated firmware to the client device from a second user device.

17. The method of claim 15, wherein the step of detecting the client device with the first user device includes the steps of:

scanning a first communications path with the first user device to detect the beacon broadcast from the client device.

18. The method of claim 15, wherein the client device is a BLE button.

\* \* \* \* \*